(12) United States Patent
Kikuchi

(10) Patent No.: US 12,120,378 B2
(45) Date of Patent: Oct. 15, 2024

(54) VIDEO DISTRIBUTION IN WHICH PROVIDED INFORMATION IS SUPERIMPOSED ON VIDEO

(71) Applicant: Rakuten Group, Inc., Tokyo (JP)

(72) Inventor: Ko Kikuchi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 18/008,614

(22) PCT Filed: Jun. 28, 2022

(86) PCT No.: PCT/JP2022/025840
§ 371 (c)(1),
(2) Date: Dec. 6, 2022

(87) PCT Pub. No.: WO2024/004052
PCT Pub. Date: Jan. 4, 2024

(65) Prior Publication Data
US 2024/0244288 A1    Jul. 18, 2024

(51) Int. Cl.
*H04N 21/431* (2011.01)
*G06T 5/50* (2006.01)
*G06T 7/50* (2017.01)

(52) U.S. Cl.
CPC ........... *H04N 21/4316* (2013.01); *G06T 5/50* (2013.01); *G06T 7/50* (2017.01); *G06T 2207/20221* (2013.01)

(58) Field of Classification Search
None
See application file for complete search history.

(56) References Cited

U.S. PATENT DOCUMENTS

| 10,757,347 | B1 * | 8/2020 | Corwin | H04N 21/4316 |
| 2016/0066024 | A1 * | 3/2016 | Gaziel | H04N 5/445 348/564 |
| 2016/0182971 | A1 * | 6/2016 | Ortiz | G06F 3/0484 725/34 |
| 2019/0163879 | A1 * | 5/2019 | O'Neall | H04L 63/102 |

(Continued)

FOREIGN PATENT DOCUMENTS

| CA | 3046752 A1 * | 6/2018 | G06Q 30/02 |
| CN | 108537860 A * | 9/2018 | G06K 9/00778 |
| JP | 2022-046577 A | 3/2022 | |

(Continued)

*Primary Examiner* — William J Kim
(74) *Attorney, Agent, or Firm* — Sughrue Mion, PLLC

(57) ABSTRACT

In an information processing device to streaming-distribute a video, based on a distance image in which a streamer is captured, an acquirer (101) acquires a depth distribution in the distance image. A determiner (102) determines a threshold value, based on the acquired depth distribution. An specifier (103) specifies, in the distance image, a distant region where depth is greater than the threshold value and a near region where depth is less than the threshold value. A provider (104) provides, in conjunction with the video, to a viewer terminal (300) to which the video is to be streaming-distributed, control information to set the distant region as a background, set the near region as a foreground, superimpose provided information over the background, and superimpose the foreground over the background over which the provided information is superimposed.

8 Claims, 13 Drawing Sheets

(56) References Cited

U.S. PATENT DOCUMENTS

2020/0302029 A1\* 9/2020 Holm ............... H04N 21/44008
2021/0201855 A1\* 7/2021 Kammachi-Sreedhar ...................
                                              H04N 13/183

FOREIGN PATENT DOCUMENTS

WO   WO-2014013689 A1 \*  1/2014  ......... G06F 17/3082
WO   WO-2018196457 A1 \*  11/2018  ............... G09G 5/14

\* cited by examiner

VIDEO DISTRIBUTION IN WHICH PROVIDED INFORMATION IS SUPERIMPOSED ON VIDEO

TECHNICAL FIELD

The present disclosure relates to video distribution in which provided information is superimposed on a video.

BACKGROUND ART

Recent years, a technology for superimposing, over a video to be streaming-distributed, provided information, which is provided with respect to the video, and causing the video and provided information to be displayed on a terminal of a viewer has been known.

For example, in Patent Literature 1, a technology is disclosed in which a terminal device displays a video, which is distributed from a video distribution server, in a video display region and displays some of comments received from a comment distribution server, which manages comments relating to the video, in such a manner as to superimpose the comments over the video displayed in the video display region.

CITATION LIST

Patent Literature

Patent Literature 1: Japanese Patent Application Publication No. 2022-046577

SUMMARY OF INVENTION

Technical Problem

There are some cases where, in a streaming-distributed video, a streamer holds an item, such as a product and a flip board, and explains about the item. In such a case, there is a problem in that, when, as the above-described technology, provided information, such as a comment, is superimposed over a video, the provided information overlaps the item and the item, which the streamer desires to show, becomes difficult to see.

The present disclosure has been made in consideration of the above-described circumstances, and an objective of the present disclosure is to provide a technology that is capable of, in a streaming-distributed video, displaying provided information without obstructing viewing of information included in the video.

Solution to Problem

An information processing device according to a first aspect of the present disclosure is an information processing device to streaming-distribute a video, based on a distance image in which a streamer is captured,
the information processing device including one or more processors,
wherein the processor executes processing of:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

A display control method according to a second aspect of the present disclosure is a display control method performed by a computer for streaming-distributing a video, based on a distance image in which a streamer is captured, the display control method including:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background and superimpose the foreground over the background over which the provided information is superimposed.

A recording medium according to a third aspect of the present disclosure records a program causing a computer for streaming-distributing a video, based on a distance image in which a streamer is captured to execute processing of:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

Advantageous Effects of Invention

According to the present disclosure, it is possible to, in a streaming-distributed video, display provided information without obstructing viewing of information included in the video.

DESCRIPTION OF EMBODIMENTS

1. Overall Configuration

Figure 1:
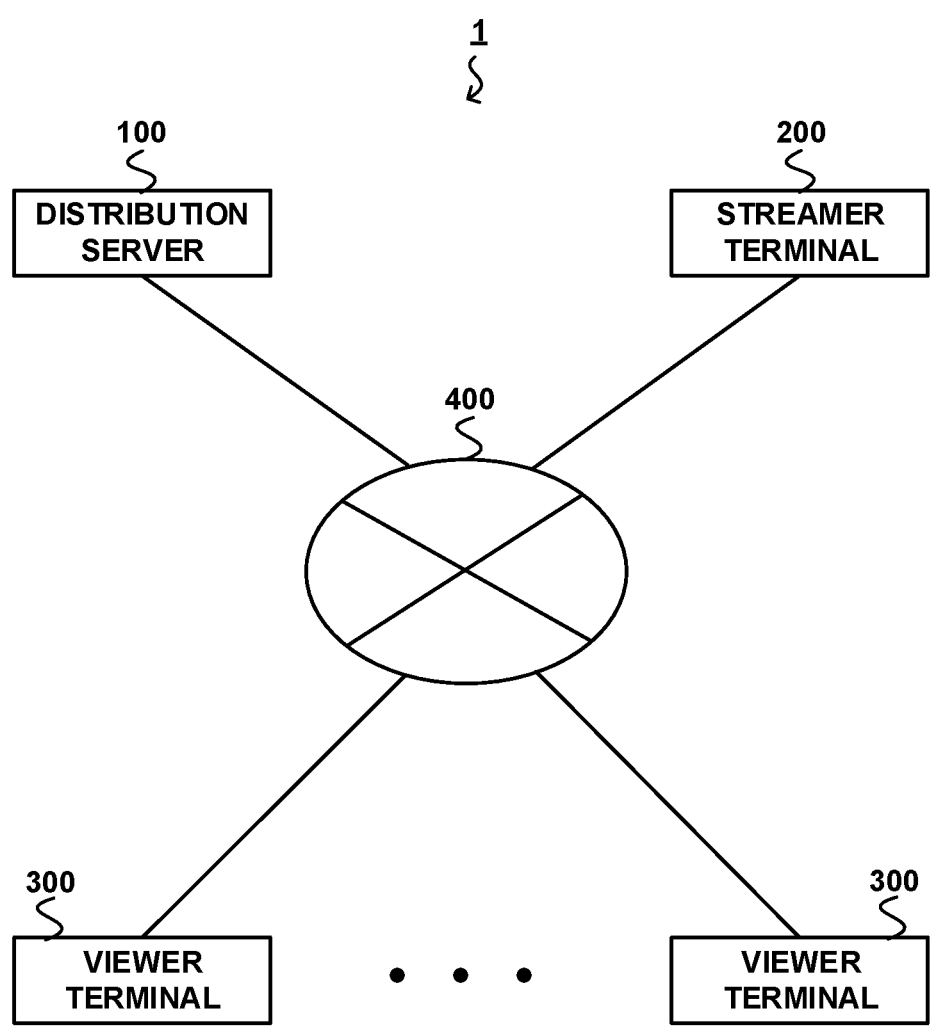
FIG. 1 is a diagram illustrating an overall configuration of a video distribution system according to an embodiment.

A video distribution system 1 according to an embodiment of the present disclosure is a system that provides a video distribution service. The video distribution system 1 includes, as illustrated in FIG. 1, a distribution server 100, a streamer terminal 200, and a plurality of viewer terminals 300, and the server and the terminals are connected to one another in a communicable manner via a computer communication network 400, such as the Internet.

The distribution server 100 is a device that manages the video distribution service that the video distribution system 1 provides. Specifically, the distribution server 100 manages a video received from the streamer terminal 200. In addition, the distribution server 100 receives provided information from a plurality of viewer terminals 300 during distribution of a video. In response to a request from a viewer terminal 300, the distribution server 100 distributes a video received from the streamer terminal 200 and provided information to the viewer terminal 300.

As used herein, the provided information is information provided by a viewer of a video being distributed and information provided by a viewer of a viewer terminal 300. The provided information is, for example, a comment on a video from a viewer.

The streamer terminal 200 is a terminal that a streamer who streams a video uses. The streamer, for example, sends a video in which the streamer captured the streamer himself/herself to the distribution server 100, using the streamer terminal 200 and streams the video to viewer terminals 300 via the distribution server 100.

The viewer terminal 300 is a terminal that a viewer who views a distributed video uses. The viewer, for example, logs in to a video distribution service that the distribution server 100 manages from the viewer terminal 300 and views a video streamed from the streamer terminal 200 via the distribution server 100. In addition, the viewer, for example, inputs provided information using the viewer terminal 300 while viewing the streamed video, and the viewer terminal 300 sends the input provided information to the distribution server 100.

2. Hardware Configuration of Information Processing Device

Figure 2:
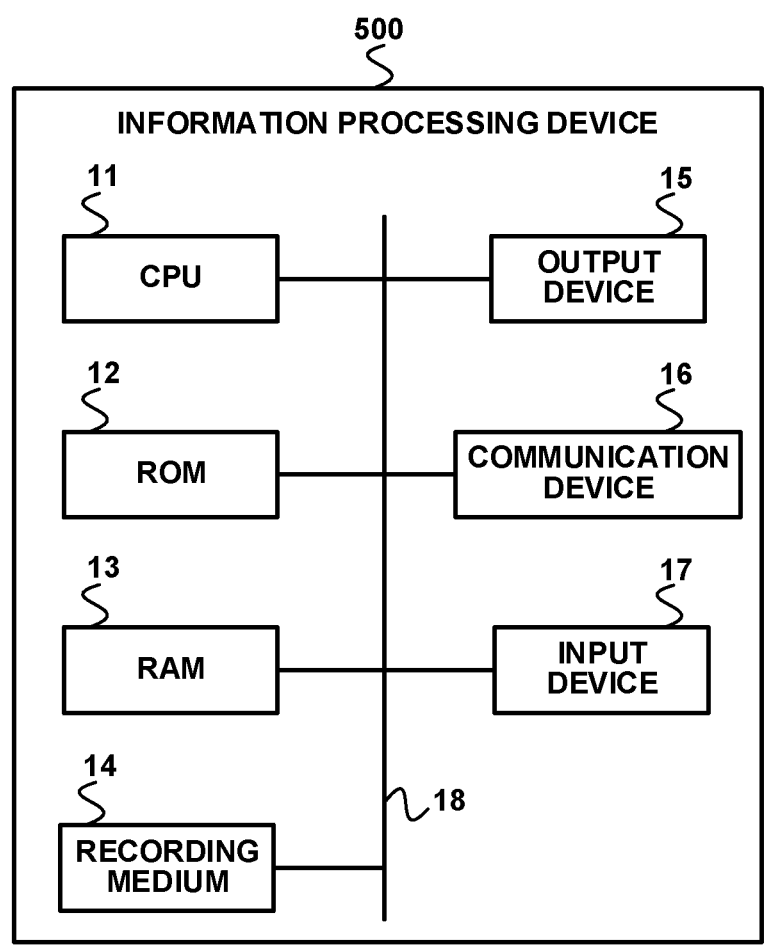
FIG. 2 is a block diagram illustrating a hardware configuration of an information processing device according to the embodiment.

FIG. 2 is a block diagram illustrating a hardware configuration of an information processing device 500 that achieves the distribution server 100, the streamer terminal 200, and each of the viewer terminals 300.

The information processing device 500 includes, as illustrated in FIG. 2, a central processing unit (CPU) 11, a read only memory (ROM) 12, a random access memory (RAM) 13, a recording medium 14, an output device 15, a communication device 16, and an input device 17. The respective constituent elements are connected to one another by a bus 18.

The CPU 11 controls operation of the entire information processing device 500, is connected to the respective constituent elements, and exchanges control signals and data.

The ROM 12 records a program and various types of data for operation necessary for operation control of the entire information processing device 500.

The RAM 13 is for temporarily recording data and a program and retains the program, data, and other data necessary for communication that are read out from the recording medium 14.

The recording medium 14 includes a hard disk, a flash memory, or the like, and records data processed by the information processing device 500.

The output device 15 includes a display device, such as a liquid crystal display (LCD) and a backlight, and a sound output device, such as a speaker. The output device 15, for example, outputs data output from the CPU 11 under the control of the CPU 11.

The communication device 16 includes a communication interface to connect the information processing device 500 to the computer communication network 400, such as the Internet, and interaction with another information processing device and the like is performed via the communication device 16.

The input device 17 includes input devices, such as a button, a keyboard, a touch panel, a microphone, a camera, and an optical scanner. The input device 17 accepts an operation input from a user of the information processing device 500 and outputs a signal corresponding to the accepted operation input to the CPU 11.

3. Functional Configuration of Distribution Server of Embodiment

Figure 3:
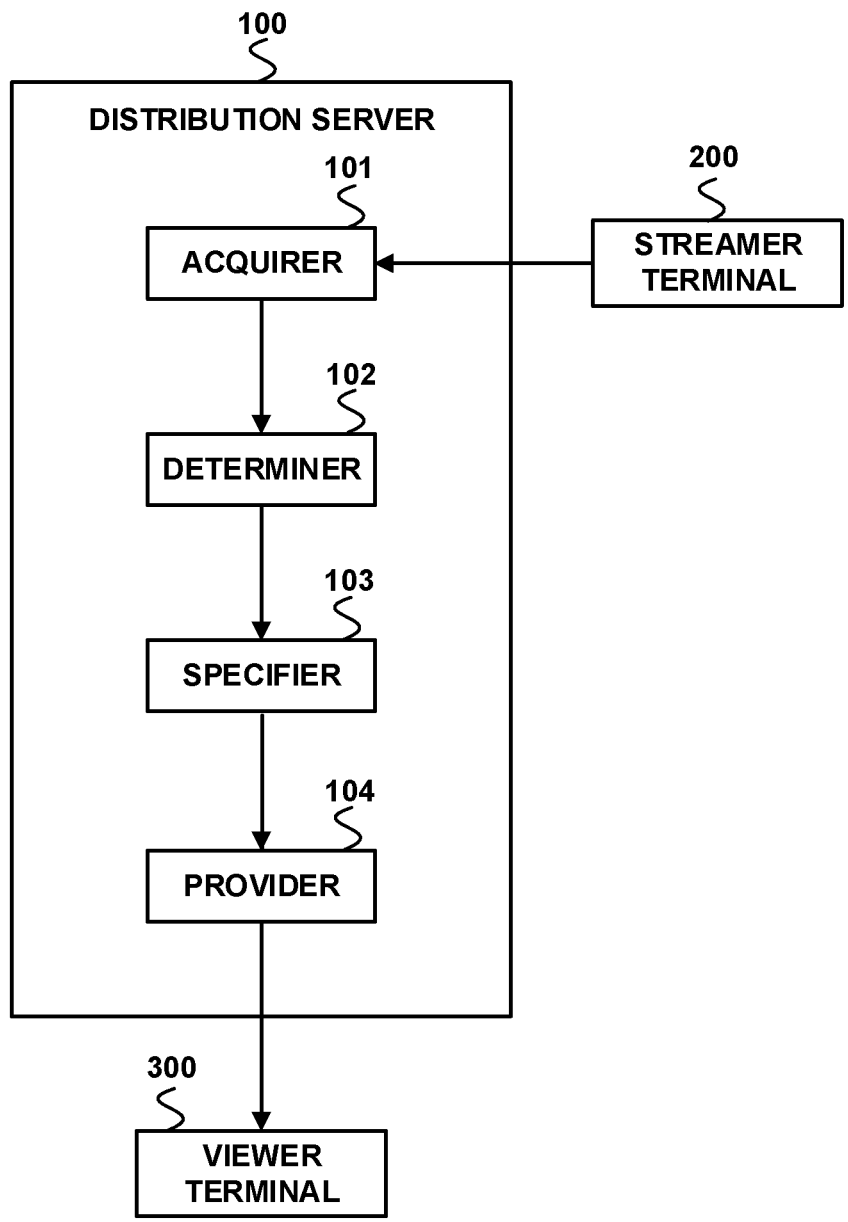
FIG. 3 is a diagram illustrating a functional configuration of a distribution server according to the embodiment.

A functional configuration of the distribution server 100 is described using FIG. 3.

The distribution server 100 functionally includes an acquirer 101, a determiner 102, an specifier 103, and a provider 104. In the present embodiment, the CPU 11 and the communication device 16 function as the acquirer 101 and the provider 104, in collaboration with each other, and the CPU 11 functions as the determiner 102 and the specifier 103.

Hereinafter, it is assumed that a video to be distributed in the video distribution service is a video in which the streamer captured the streamer himself/herself. The distribution server 100 streaming-distributes the video, based on a distance image in which the streamer is captured.

The distance image is an image in which a value of each pixel indicates distance to a subject. The distance image may be an image acquired through image capturing using a dedicated hardware, such as a depth camera, or an image acquired by performing distance estimation processing on a video captured by a general-purpose camera. Therefore, the streamer terminal 200 that captures the video may generate the distance image or the distribution server 100 may generate the distance image, based on the received video. The distance image is, as described later, used for acquisition of a depth distribution by the acquirer 101.

Figure 4:
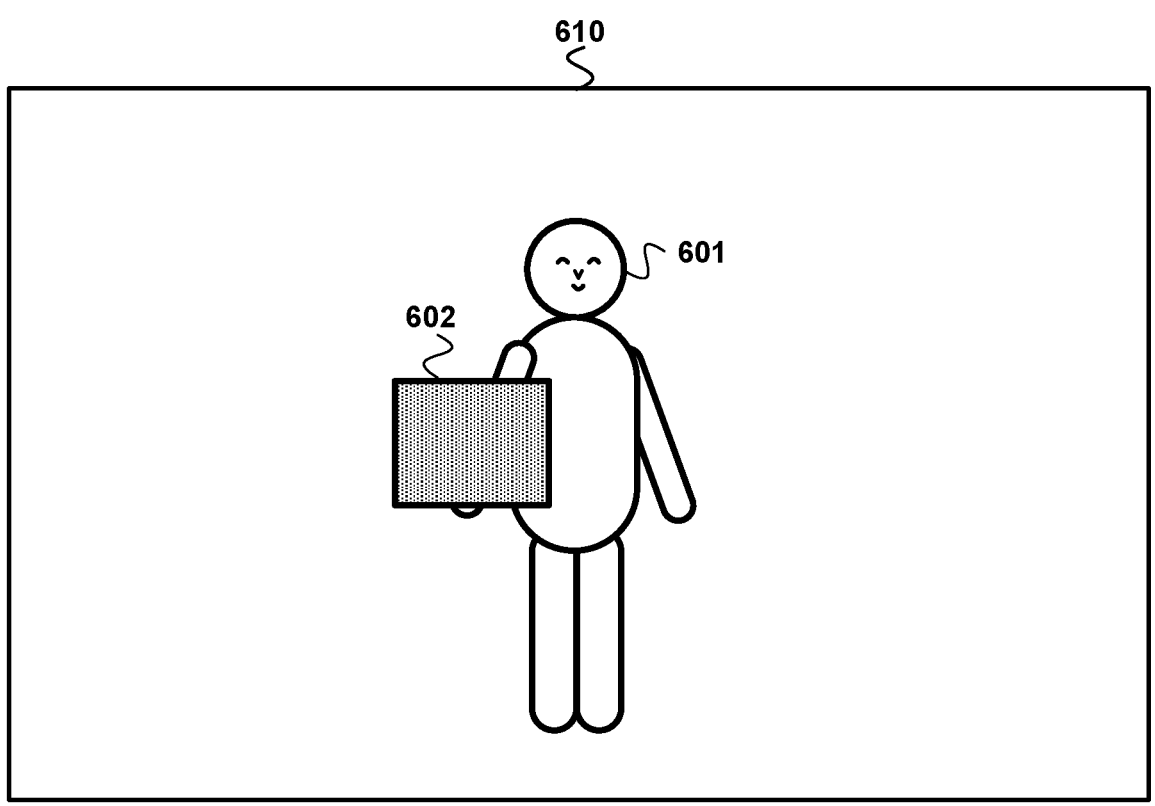
FIG. 4 is a diagram for a description of a video received from a streamer terminal according to the embodiment.

In the video that the distribution server 100 distributes to the viewer terminal 300, a video in which the streamer is captured and the provided information provided from the viewers who use the viewer terminals 300 are included. In FIG. 4, an image 610 in a video received from the streamer terminal 200 is illustrated. The image 610 indicates an appearance in which a streamer 601 holds an item 602 in front of his/her body and explains about the item 602. In addition, in FIG. 5, an image 620 in which pieces of provided information 603 to 605 received from the viewer terminals 300 are included is illustrated. Each of the pieces of provided information 603 to 605 is information provided by one of a plurality of viewers viewing the video being distributed. Each of the pieces of provided information is arranged at an arbitrary location, such as a random location, by the distribution server 100. The distribution server 100 sends information for superimposing the image 620 over the image 610 to the viewer terminal 300.

Figure 6:
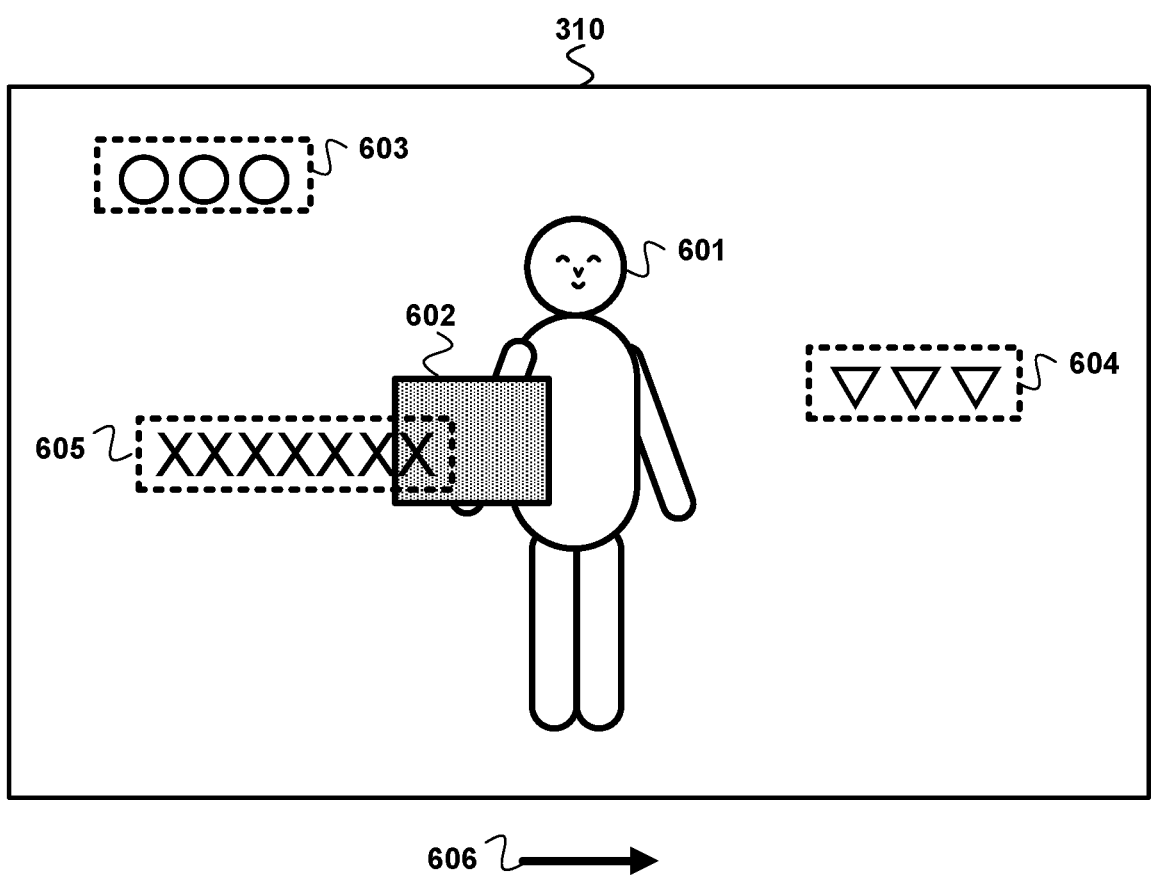
FIG. 6 is a diagram illustrating an appearance in which the provided information is displayed on a screen of a viewer terminal according to the embodiment.

In FIG. 6, an appearance in which the video distributed from the distribution server 100 is displayed on a screen 310 of the viewer terminal 300 is illustrated. On the screen 310, the pieces of provided information 603 to 605 are displayed superimposed over the video in which the streamer 601 is captured. Starting from outside of the screen 310, the provided information 603 keeps moving with time in the direction of an arrow 606 and toward an inner part of the screen 310 and then disappears out of the screen.

On the screen 310 in FIG. 6, the provided information 605 overlaps the item 602, and the item 602 is hidden by the provided information 605 and is thus difficult to see. Hereinafter, a method for displaying provided information in such a manner that the provided information 605 does not hide the item 602 is described.

The acquirer 101 in FIG. 3 acquires a depth distribution in a distance image.

For example, the acquirer 101 receives a distance image of the image 610 in FIG. 4 from the streamer terminal 200 and acquires a depth distribution of a subject in the distance image.

In this example, in the acquired depth distribution, a distribution D1 indicating depth of the streamer 601 and a distribution D2 indicating depth of the item 602 are included. Therefore, the acquired depth distribution can be regarded as a mixed distribution.

The determiner 102 determines a threshold value, based on the acquired depth distribution.

Specifically, the determiner 102 separates the acquired depth distribution into a first distribution and a second distribution and, when a first representative value of the first distribution and a second representative value of the second distribution are sufficiently separated from each other, determines a middle value between the first representative value and the second representative value as the threshold value.

The first representative value is a value representing the first distribution, such as an average value, a median value, and a mode value of the first distribution. In addition, the second representative value is a value representing the second distribution, such as an average value, a median value, and a mode value of the second distribution. Hereinafter, it is assumed that the first representative value is the average value of the first distribution and the second representative value is the average value of the second distribution.

For example, the determiner 102, by allocating the distribution D1, which indicates the depth of the streamer 601, to the first distribution and the distribution D2, which indicates the depth of the item 602, to the second distribution, separates the acquired depth distribution. Note that, as a method for separating an acquired depth distribution into a first distribution and a second distribution, a known method, such as an expectation maximization (EM) algorithm for a mixed normal distribution, is employed. Next, when an average value $\mu 1$ of the distribution D1, which indicates the depth of the streamer 601, and an average value $\mu 2$ of the distribution D2, which indicates the depth of the item 602, are sufficiently separated from each other, the determiner 102 sets the middle value $(\mu 1+\mu 2)/2$ of the average value $\mu 1$ of the distribution D1 and the average value $\mu 2$ of the distribution D2 as the threshold value.

In this processing, when a difference between the first representative value and the second representative value is greater than a value obtained by multiplying the sum of a standard deviation of the first distribution and a standard deviation of the second distribution by a predetermined value, the determiner 102 determines that the first representative value of the first distribution and the second representative value of the second distribution are sufficiently separated from each other.

For example, when a difference $(\mu 1-\mu 2)$ between the average value $\mu 1$ of the distribution D1, which indicates the depth of the streamer 601, and the average value $\mu 2$ of the distribution D2, which indicates the depth of the item 602, is greater than a number $((\sigma 1+\sigma 2) \times \alpha)$ obtained by multiplying the sum of a standard deviation $\sigma 1$ of the distribution D1 and a standard deviation $\sigma 2$ of the distribution D2 by a positive constant $\alpha$, the determiner 102 determines that the average value $\mu 1$ of the distribution D1 and the average value $\mu 2$ of the distribution D2 are sufficiently separated from each other. Note that, although, for example, a value of 1 to 2 is set as the positive constant $\alpha$, the positive constant $\alpha$ can be appropriately set by an administrator of the distribution server 100.

The specifier 103 specifies, in the distance image, a distant region where the depth is greater than the threshold value and a near region where the depth is less than the threshold value.

The distant region is a region where the depth is greater than the threshold value and a region located relatively distant from the front of the screen. The near region is a region where the depth is less than the threshold value and a region located relatively near to the front of the screen.

For example, when it is assumed that the threshold value is the middle value $(\mu 1+\mu 2)/2$ of the average value $\mu 1$ of the distribution D1 and the average value $\mu 2$ of the distribution D2, the specifier 103 specifies, within the video received from the streamer terminal 200, a region encompassing or including the item 602 as the near region and a region that is a region other than the near region and is composed of a region including the streamer 601 and the other region excluding the streamer 601 as the distant region.

On this occasion, the specifier 103 compensates the near region so as to be a region of a predetermined shape and compensates the distant region so as to be a region excluding the region of the predetermined shape.

The predetermined shape is any shape, such as a rectangle and an ellipse, and the administrator of the distribution server 100 can freely determine the predetermined shape. The region of the predetermined shape is a region that encompasses or includes the near region and is larger than the near region. Therefore, the region of the predetermined shape includes the near region before compensation and a portion of the distant region before compensation.

There is a possibility that, depending on precision of the distance image, a portion of the edge of the item 602 is not included in the specified near region. Thus, compensating the specified near region to a region of a predetermined shape including the near region enables the entire item 602 to be included in the near region. In the following description, it is assumed that the predetermined shape is a rectangle, the region of the predetermined shape has area obtained by multiplying the area of the near region by a positive constant β (β is greater than 1), and the region of the predetermined shape is a region the center of which coincides with the center of the near region before compensation.

Figure 7:
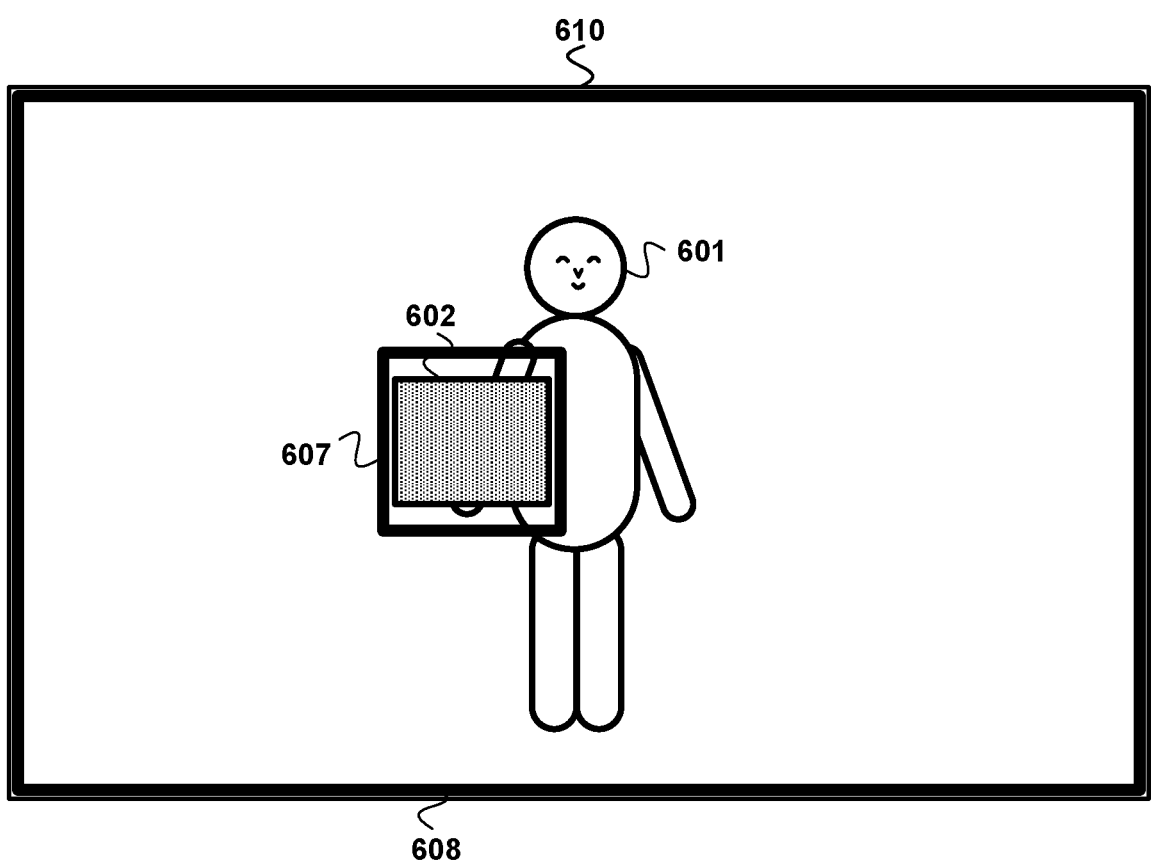
FIG. 7 is a diagram for a description of a distant region and a near region according to the embodiment.

In FIG. 7, a near region 607 after compensation and a distant region 608 after compensation are illustrated. In the near region 607, the whole of a region in which the item 602 is displayed is included. In the distant region 608, the entire region excluding the near region 607 is included.

The provider 104 provides, in conjunction with the video, to the viewer terminal 300 to which the video is to be streaming-distributed, control information to set the distant region as a background, set the near region as a foreground, superimpose provided information over the background, and superimpose the foreground over the background over which the provided information is superimposed.

The control information is information to control a display form of provided information to be displayed on the viewer terminal 300. The distribution server 100 sends the control information to the viewer terminal 300 that the viewer uses and causes the viewer terminal 300 to display the provided information provided by viewers, based on the control information.

On this occasion, the provider 104 provides control information to cause the provided information to be displayed in such a way that the provided information, starting from outside of a screen of the viewer terminal, keeps moving toward an inner part of the screen and disappears out of the screen.

For example, the provider 104 provides control information to cause the pieces of provided information 603 to 605 to, starting from outside of the screen 310, keep moving with time in the direction of the arrow 606 and toward an inner part of the screen 310 and then disappear out of the screen 310.

Figure 5:
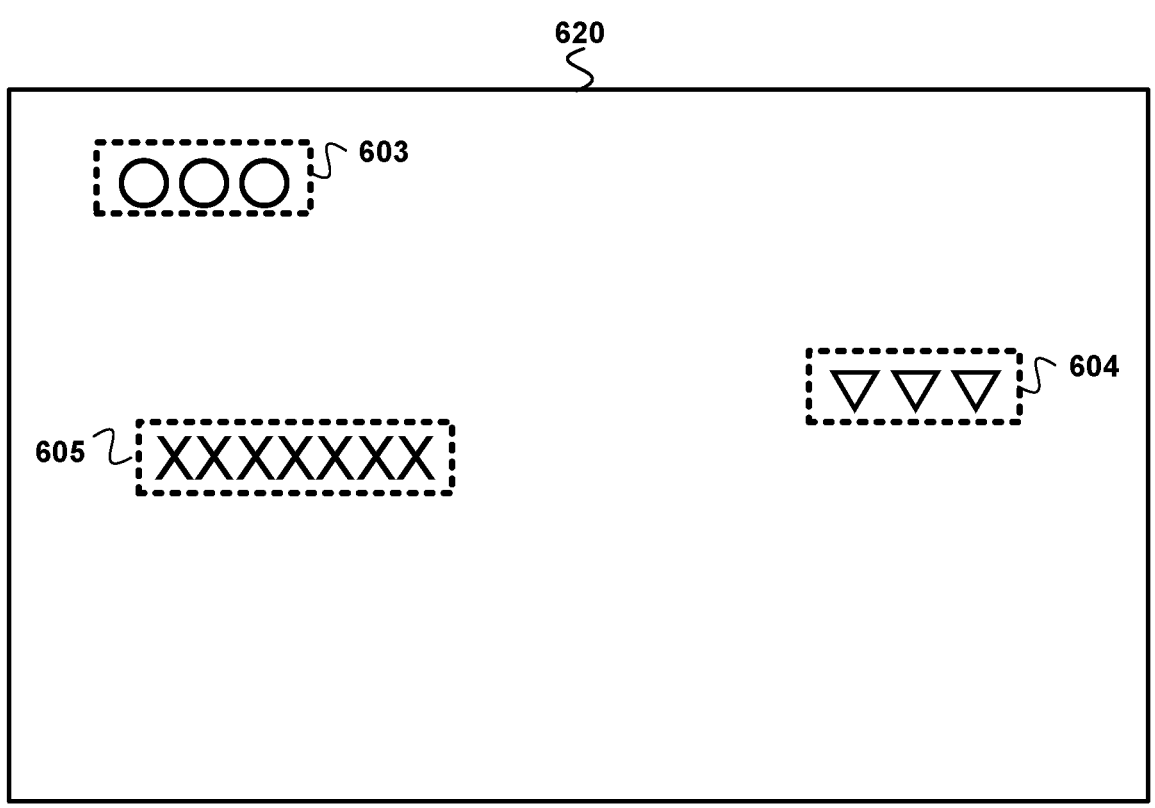
FIG. 5 is a diagram for a description of provided information according to the embodiment.
Figure 8:
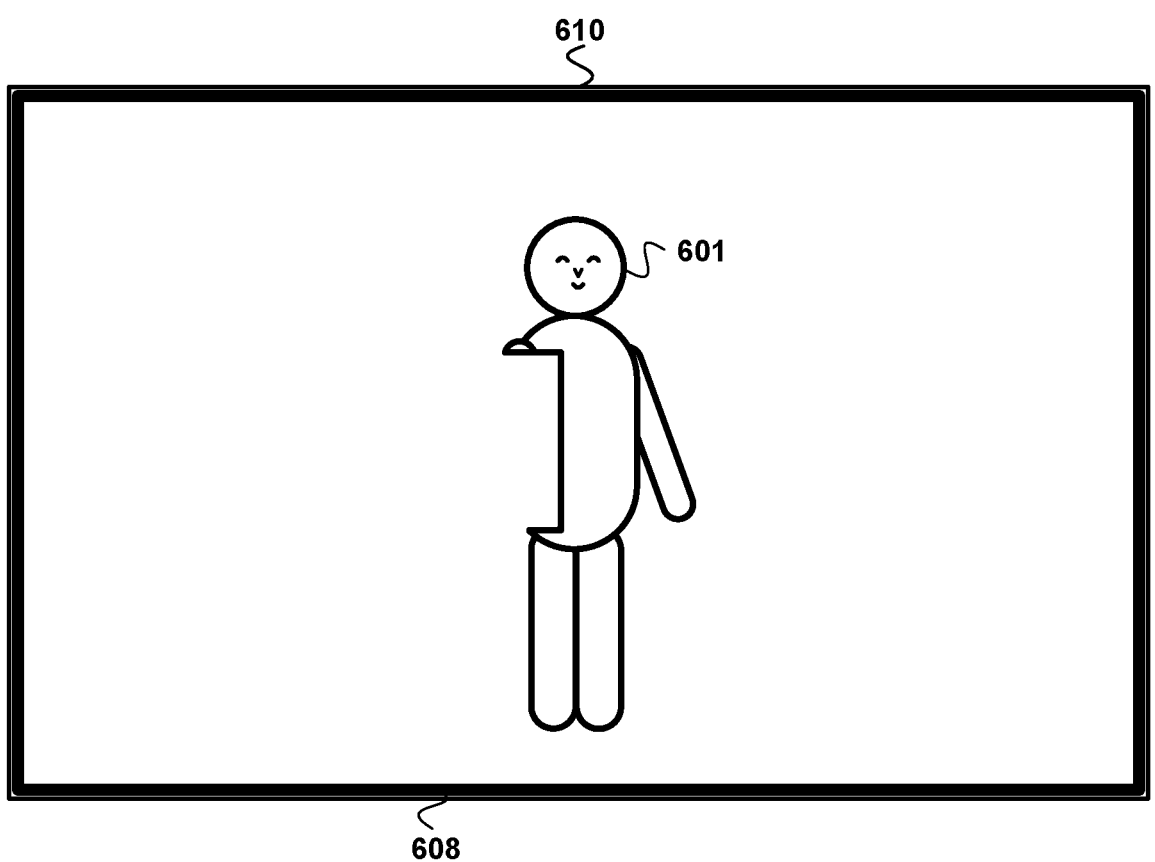
FIG. 8 is a diagram for a description of a background according to the embodiment.
Figure 9:
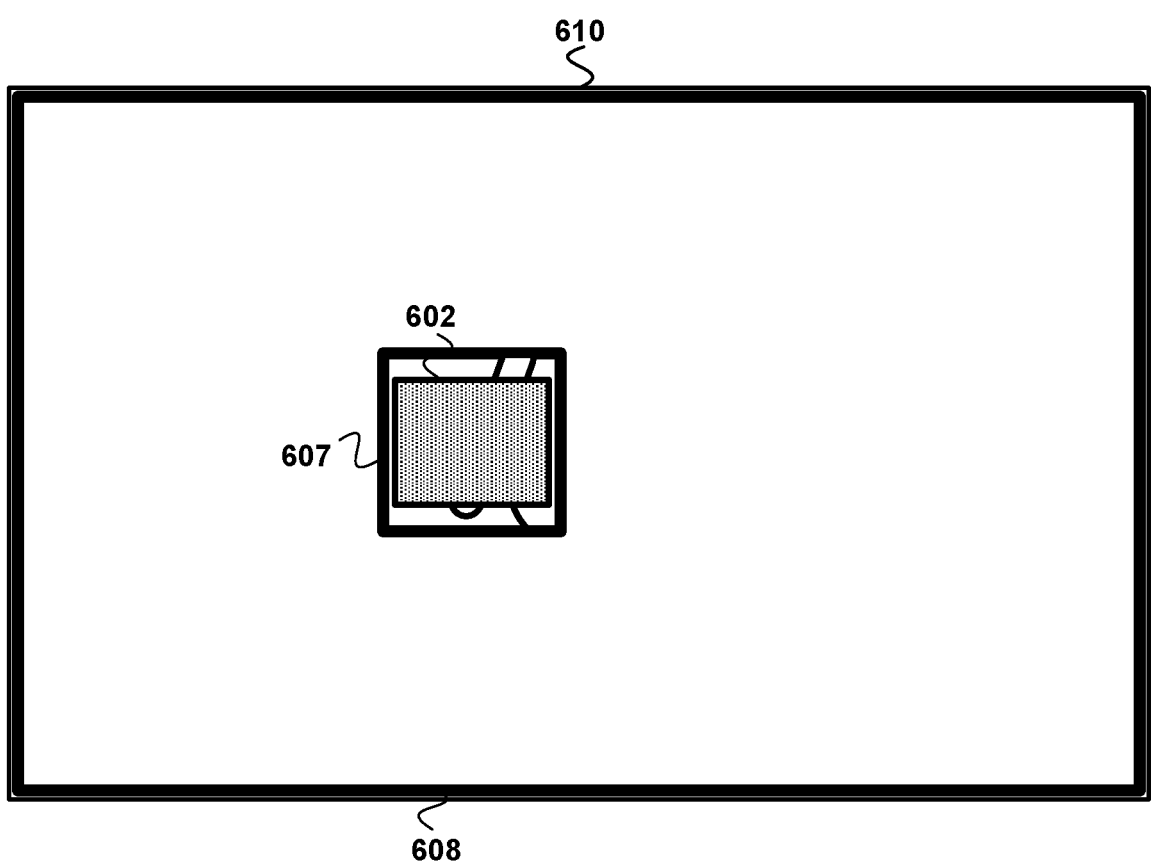
FIG. 9 is a diagram for a description of a foreground according to the embodiment.

In FIGS. 8 and 9, a background 630 of the image 610 and a foreground 640 of the image 610 are illustrated, respectively. The background 630 is an image in which the distant region 608 within the image 610 in FIG. 7 is displayed, and the foreground 640 is an image in which only the near region 607 within the image 610 in FIG. 7 is displayed. The provider 104 generates control information to superimpose the image 620, in which the pieces of provided information 603 to 605 in FIG. 5 are included, over the background 630 in FIG. 8 and further superimpose the foreground 640 in FIG. 9 thereover. That is, the provider 104 generates control information to superimpose a layer of the image 620 of the provided information in FIG. 5 over a layer of the background 630 and superimpose a layer of the foreground 640 thereover. The provider 104 sends the generated control information to the viewer terminal 300 to which the video is to be streaming-distributed in conjunction with the video.

Figure 10:
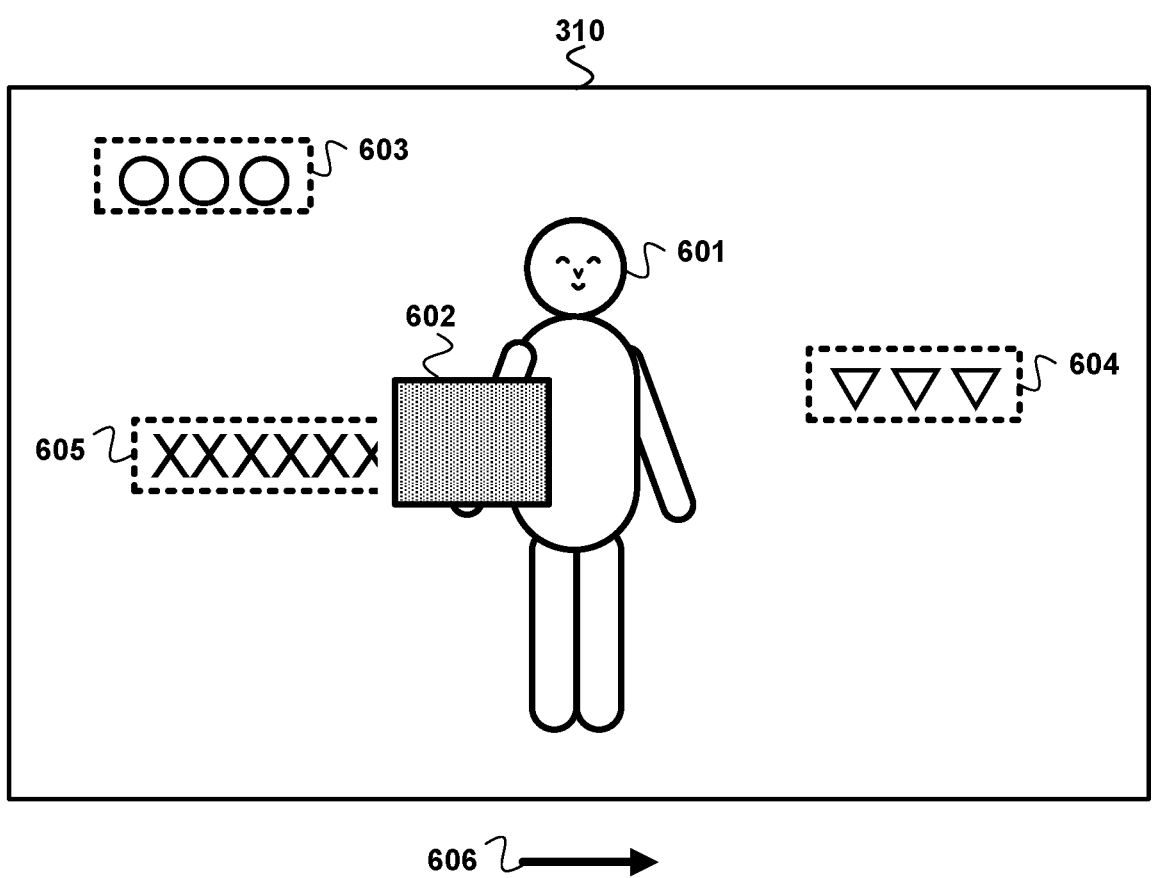
FIG. 10 is a diagram illustrating another appearance in which the provided information is displayed on the screen of the viewer terminal according to the embodiment.

In FIG. 10, an appearance of the video displayed on the screen 310 of a viewer terminal 300, based on the control information sent from the distribution server 100 is illustrated. In the screen 310 in FIG. 10, the provided information 605 is displayed behind the near region encompassing the item 602.

Figure 11:
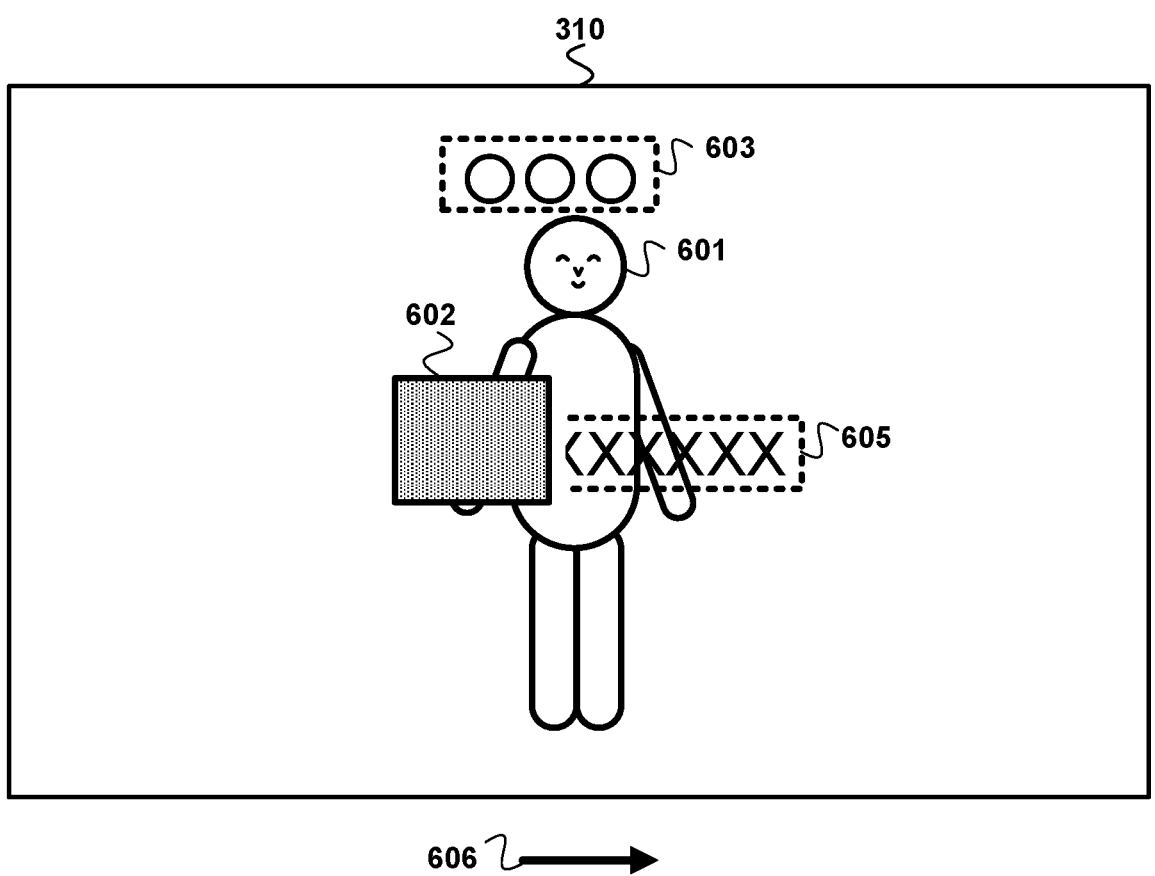
FIG. 11 is a diagram illustrating still another appearance in which the provided information is displayed on the screen of the viewer terminal according to the embodiment.

In FIG. 11, an appearance of the screen 310 displayed several seconds after the screen 310 in FIG. 10 is illustrated. In the screen 310 in FIG. 11, the provided information 605 moves in the direction indicated by the arrow 606 and is displayed behind the near region including the item 602 and in front of the distant region including the streamer 601.

In addition, the provider 104 provides, to the streamer terminal 200 with which the streamer captures a video, control information to cause the streamer terminal 200 to display a video or a distance image that is currently being captured and display the distant region and the near region in different display forms in the distance image.

For example, the provider 104 generates control information to, by filtering one region with a red filter and filtering the other region with a blue filter, cause the distant region and the near region to be displayed in different display forms and sends the generated control information to the streamer terminal 200.

Figure 12:
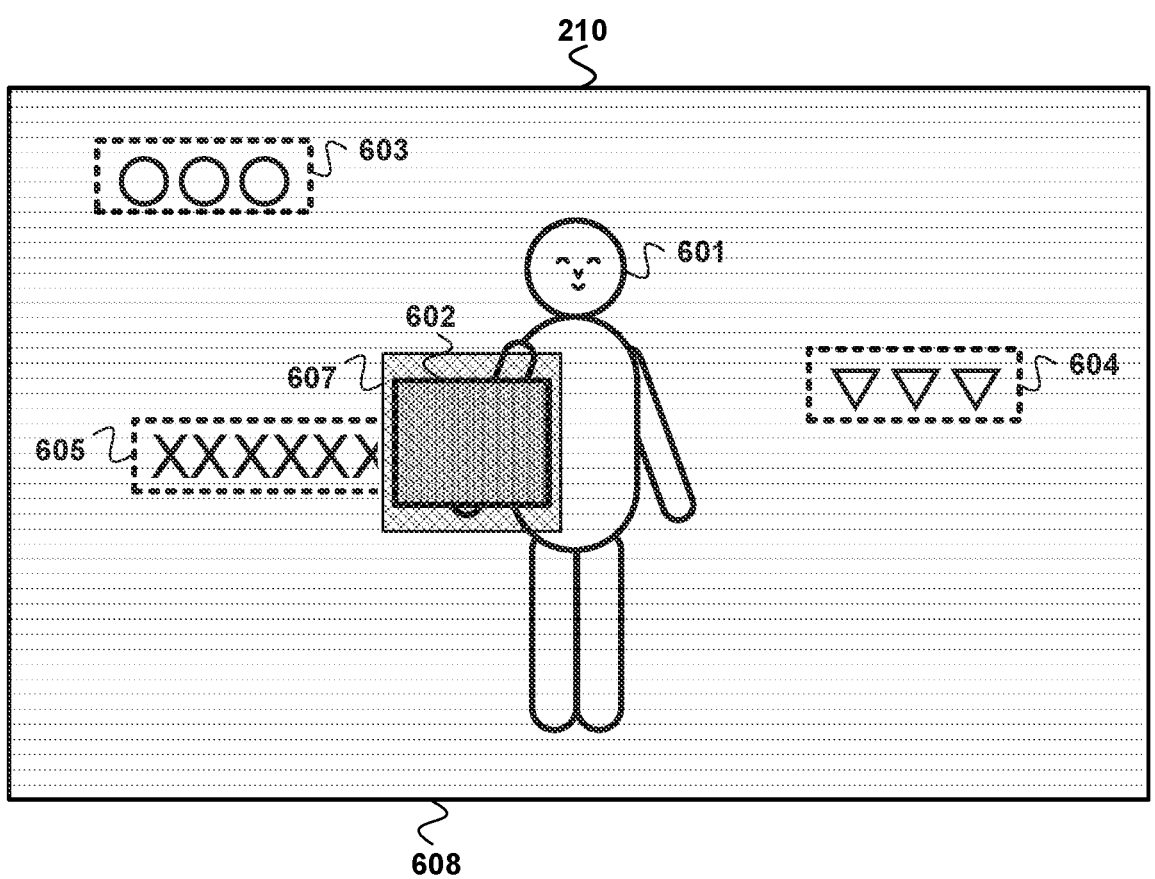
FIG. 12 is a diagram illustrating an appearance in which the near region and the distant region are displayed in different display forms on a screen of the streamer terminal according to the embodiment.

In FIG. 12, an appearance in which the video is displayed on a screen 210 of the streamer terminal 200, based on the control information sent from the distribution server 100 is illustrated. On the screen 210 in FIG. 12, the near region 607 and the distant region 608 are displayed in different display forms. The streamer 601 can, during capturing of the video, confirm whether or not the item 602 that the streamer 601 holds is displayed in the foreground without being hidden behind the provided information.

4. Operation of Distribution Server of Embodiment

Figure 13:
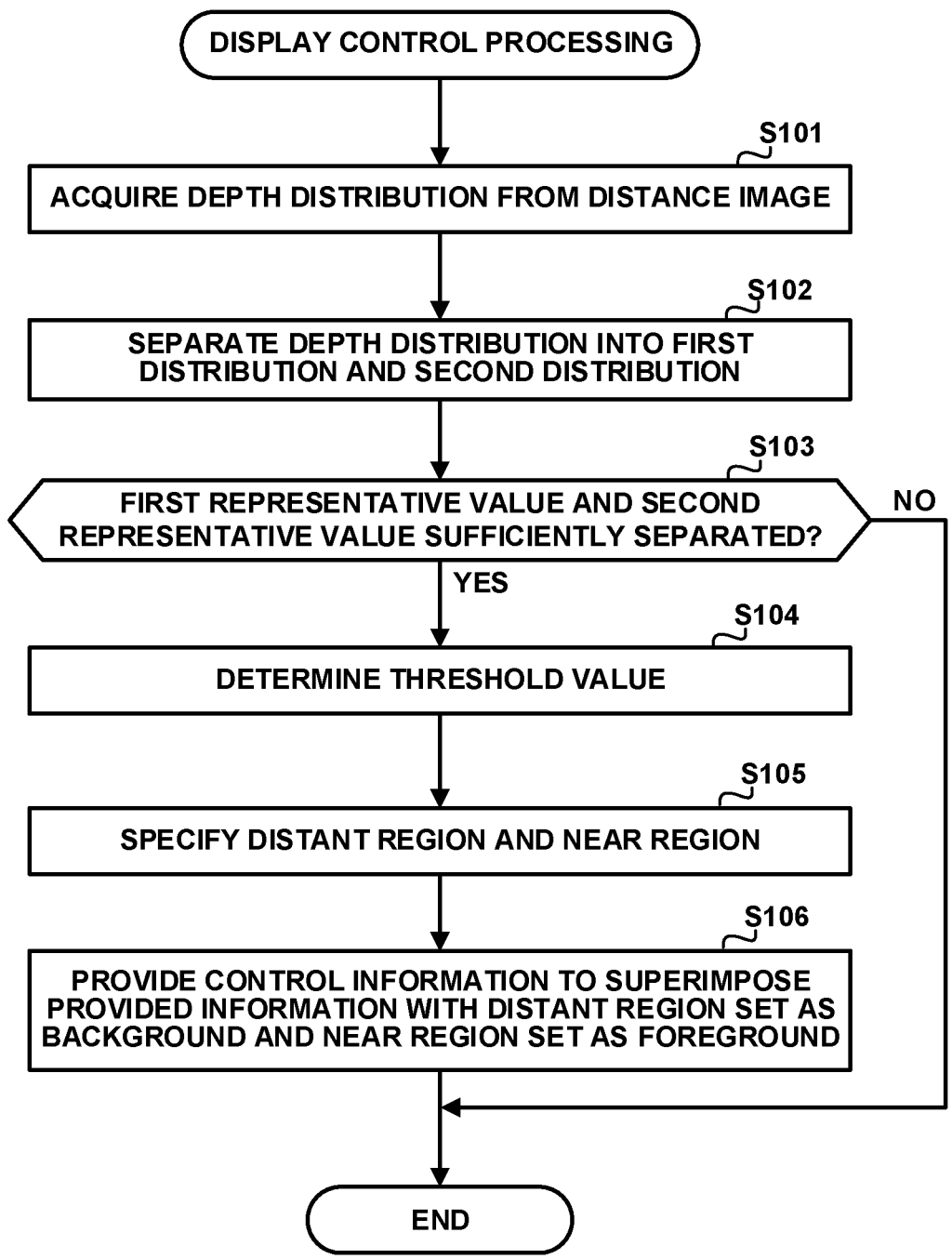
FIG. 13 is a flowchart illustrating display control processing according to the embodiment.

Operation of the distribution server 100 of the present embodiment is described using FIG. 13. Display control processing in FIG. 13 is, for example, executed with respect to each frame in the video that the distribution server 100 distributes.

The acquirer 101 acquires a depth distribution in a distance image (step S101).

For example, the acquirer 101 receives the distance image of the image 610 in FIG. 4 from the streamer terminal 200 and acquires a depth distribution of a subject in the distance image.

The determiner 102 separates the acquired depth distribution into a first distribution and a second distribution (step S102).

For example, the determiner 102 separates the acquired depth distribution by allocating the distribution D1 indicating the depth of the streamer 601 to the first distribution and the distribution D2 indicating the depth of the item 602 to the second distribution, using a known method.

Next, the determiner 102 determines whether or not a first representative value of the first distribution and a second representative value of the second distribution are sufficiently separated from each other (step S103). When the determiner 102 determines that the first representative value and the second representative value are sufficiently separated from each other (step S103; YES), the determiner 102 determines a threshold value (step S104). In contrast, when the determiner 102 determines that the first representative value and the second representative value are not sufficiently separated from each other (step S103; NO), the determiner 102 terminates the process.

For example, when the difference ($\mu_1 - \mu_2$) between the average value $\mu_1$ of the distribution D1, which indicates the depth of the streamer 601, and the average value $\mu_2$ of the distribution D2, which indicates the depth of the item 602, is greater than a number (($\sigma_1 + \sigma_2$)×1) obtained by multiplying the sum of the standard deviation $\sigma_1$ of the distribution D1 and the standard deviation $\sigma_2$ of the distribution D2 by 1, the determiner 102 determines that the first representative value and the second representative value are sufficiently separated from each other. The determiner 102 sets the middle value ($\mu_1 + \mu_2$)/2 of the average value $\mu_1$ of the distribution D1 and the average value $\mu_2$ of the distribution D2 as the threshold value. In contrast, when the difference ($\mu_1 - \mu_2$) is less than or equal to the number (($\sigma_1 + \sigma_2$)×1), the determiner 102 determines that the first representative value and the second representative value are not sufficiently separated from each other and terminates the process.

The specifier 103 specifies, in the distance image, a distant region where the depth is greater than the threshold value and a near region where the depth is less than the threshold value (step S105).

For example, the specifier 103 specifies the region including the item 602 as the near region within the video received from the streamer terminal 200, compensates the specified near region with the region of the predetermined shape, and specifies the near region 607. In addition, the specifier 103 specifies the region that is the region other than the near region 607 and is composed of the region including the streamer 601 and the other region excluding the streamer 601, as the distant region 608.

The provider 104 provides, in conjunction with the video, to the viewer terminal 300 to which the video is to be streaming-distributed control information to set the distant region as a background, set the near region as a foreground, superimpose provided information over the background, and superimpose the foreground over the background over which the provided information is superimposed (step S106).

For example, the provider 104 generates control information to superimpose the image 620, in which the pieces of provided information 603 to 605 in FIG. 5 are included, over the background 630 in FIG. 8 and further superimpose the foreground 640 in FIG. 9 thereover. The provider 104 sends the generated control information to the viewer terminal 300 to which the video is to be streaming-distributed in conjunction with the video.

When, in a video in which a streamer is captured, the streamer refers to an item, the item is often arranged relatively nearer to the front side in the depth direction than the streamer. According to the present embodiment, it is possible to, in a streaming-distributed video, specify a near region located relatively near to the front side in the depth direction, based on a distance image and display the near region in such a manner that the near region is, as the foreground, superimposed over provided information. This configuration enables displaying the provided information in a video without causing the provided information to overlap an object displayed relatively near to the front side, such as an item to which a streamer refers. Therefore, in a streaming-distributed video, provided information can be displayed without obstructing viewing of information included in the video.

In addition, according to the present embodiment, it is possible to specify a distant region located relatively distant in the depth direction, based on a distance image and, with the distant region set as the background, display provided information in such a manner as to superimpose the provided information over the distant region. This configuration enables performing display in such a manner as to superimpose provided information over the image of the streamer that is displayed in the distant region. Therefore, a viewer can view an appearance of the streamer while viewing provided information.

In addition, according to the present embodiment, it is possible to display provided information provided by viewers while causing the provided information to move on the screen. This configuration allows a viewer to grasp, even when the provided information is hidden behind the near region, the whole of the provided information as time passes.

In addition, according to the present embodiment, it is possible to compensate the near region so as to be a region of a predetermined shape encompassing the near region and compensate the distant region so as to be a region excluding the region of the predetermined shape. This configuration enables, even when precision of a distance image is low, appropriately including an object displayed relatively near to the front side in the near region and performing display without causing provided information to overlap the object displayed relatively near to the front side.

In addition, according to the present embodiment, a depth distribution acquired from a distance image is, as a mixed distribution, separated into two distributions and, when representative values of the two separated distributions are sufficiently separated from each other, the middle value between the representative values is determined as a threshold value. This configuration enables appropriately determining a threshold value to specify the near region and the distant region from separated distributions.

In addition, according to the present embodiment, when, upon determination of the threshold value, a difference between representative values of two distributions is greater than a value obtained by multiplying the sum of standard deviations of the two distributions by a predetermined value, the representative values of the two distributions are determined to be sufficiently separated from each other. This configuration enables appropriately determining, based on information acquired from the distributions, whether or not representative values of the two separated distributions are sufficiently separated from each other.

In addition, according to the present embodiment, it is possible to display, on a screen of a streamer terminal with which a streamer captures a video, a distance image that is currently being captured and display the distant region and the near region in different display forms. This configuration allows the streamer to, while capturing a video, confirm whether or not an object desired to be displayed relatively near to the front side is, without being hidden behind provided information, displayed in the foreground on the screen.

5. Variations

Although the embodiment of the present disclosure is described above, when the present disclosure is to be embodied, various forms of modifications and applications can be made.

Although, in the above-described embodiment, one distribution server 100 is included in the video distribution system 1, the present disclosure is not limited thereto. The functions of the distribution server 100 may be achieved by a plurality of servers. In addition, the distribution server 100 includes at least one or more processors. For example, when the distribution server 100 includes two or more processors, the processors may perform processing that the acquirer 101, the determiner 102, the specifier 103, and the provider 104 execute, in a distributed manner.

In addition, although, in the above-described embodiment, it was described that the distribution server 100 provided control information, the present disclosure is not limited thereto, and the viewer terminal 300 may provide the viewer terminal 300 itself with control information. In other words, each viewer terminal 300 may have the functions of the acquirer 101, the determiner 102, the specifier 103, and the provider 104.

In addition, although, in the above-described embodiment, it was described that the video was a video in which the streamer captured the streamer himself/herself, the present disclosure is not limited thereto, and any type of video may be used as long as a depth distribution in an image capturing space can be acquired from the video. The video may, for example, be a video in which an avatar in a virtual space is captured.

In addition, it is possible to, by applying a program defining operation of the distribution server 100 according to the above-described embodiment to an existing personal computer or information terminal device, cause the personal computer or the information terminal device to function as the distribution server 100 according to the embodiment.

In addition, the above-described program may be recorded in a non-transitory recording medium. The non-transitory recording medium can be distributed and sold independently of a computer. As used herein, the non-transitory recording medium means a tangible recording medium. The non-transitory recording medium is, for example, a compact disk, a flexible disk, a hard disk, a magneto optical disk, a digital video disk, a magnetic tape, a semiconductor memory, or the like. In addition, a transitory recording medium means a transmission medium (propagated signal) itself. The transitory recording medium is, for example, an electrical signal, an optical signal, electromagnetic waves, or the like. Note that a temporary storage area is an area for temporarily storing data and a program and is, for example, a volatile memory, such as a RAM.

Supplementary Note

[1]

An information processing device to streaming-distribute a video, based on a distance image in which a streamer is captured, including one or more processors,
wherein the processor executes processing of:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

[2]

The information processing device according to [1], wherein
the provided information is information provided by a viewer of the viewer terminal, and
the processor executes processing of providing control information to cause the provided information to be displayed in such a way that the provided information, starting from outside of a screen of the viewer terminal, keeps moving toward an inner part of the screen and disappears out of the screen.

[3]

The information processing device according to [1] or [2], wherein the processor executes processing of:
compensating the near region so as to be a region of a predetermined shape encompassing the near region;
compensating the distant region so as to be a region excluding the region of the predetermined shape; and
setting the compensated distant region as the background and the compensated near region as the foreground.

[4]

The information processing device according to any one of [1] to [3], wherein
the acquired depth distribution is a mixed distribution, and
the processor executes processing of:
separating the acquired depth distribution into a first distribution and a second distribution; and
when a first representative value of the first distribution and a second representative value of the second distribution are sufficiently separated from each other, determining a middle value between the first representative value and the second representative value as the threshold value.

[5]

The information processing device according to [4], wherein the processor executes processing of, when a difference between the first representative value and the second representative value is greater than a value obtained by multiplying a sum of a standard deviation of the first distribution and a standard deviation of the second distribution by a predetermined value, determining that the first representative value of the first distribution and the second representative value of the second distribution are sufficiently separated from each other.

[6]

The information processing device according to any one of [1] to [5], wherein the processor executes processing of providing a streamer terminal with which the streamer captures a video with control information to cause the streamer terminal to display a video or a distance image that is currently being captured and display the distant region and the near region in different display forms in the distance image.

[7]

A display control method performed by a computer for streaming-distributing a video, based on a distance image in which a streamer is captured, the display control method comprising:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

[8]

A computer-readable recording medium recording a program causing a computer for streaming-distributing a video, based on a distance image in which a streamer is captured to execute processing of:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

According to the present disclosure, the information processing device can be suitably employed for video distribution that is capable of, in a streaming-distributed video, causing provided information to be displayed without obstructing viewing of information included in the video.

REFERENCE SIGNS LIST

1 Video distribution system
11 CPU
12 ROM
13 RAM
14 Recording medium
15 Output device
16 Communication device
17 Input device
18 Bus
100 Distribution server
101 Acquirer
102 Determiner
103 Specifier
104 Provider
200 Streamer terminal
210, 310 Screen
300 Viewer terminal
400 Computer communication network
500 Information processing device
601 Streamer
602 Item
603 to 605 Provided information
606 Arrow
607 Near region
608 Distant region
610, 620 Image
630 Background
640 Foreground

The invention claimed is:

1. An information processing device to streaming-distribute a video, based on a distance image in which a streamer is captured, comprising one or more processors,
wherein the processor executes processing of:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

2. The information processing device according to claim 1, wherein
the provided information is information provided by a viewer of the viewer terminal, and
the processor executes processing of providing control information to cause the provided information to be displayed in such a way that the provided information, starting from outside of a screen of the viewer terminal, keeps moving toward an inner part of the screen and disappears out of the screen.

3. The information processing device according to claim 1, wherein the processor executes processing of:
compensating the near region so as to be a region of a predetermined shape encompassing the near region;
compensating the distant region so as to be a region excluding the region of the predetermined shape; and
setting the compensated distant region as the background and the compensated near region as the foreground.

4. The information processing device according to claim 1, wherein
the acquired depth distribution is a mixed distribution, and
the processor executes processing of:
separating the acquired depth distribution into a first distribution and a second distribution; and
when a first representative value of the first distribution and a second representative value of the second distribution are sufficiently separated from each other, determining a middle value between the first representative value and the second representative value as the threshold value.

5. The information processing device according to claim 4, wherein the processor executes processing of, when a difference between the first representative value and the second representative value is greater than a value obtained by multiplying a sum of a standard deviation of the first distribution and a standard deviation of the second distribution by a predetermined value, determining that the first representative value of the first distribution and the second representative value of the second distribution are sufficiently separated from each other.

6. The information processing device according to claim 1, wherein the processor executes processing of providing a streamer terminal with which the streamer captures a video with control information to cause the streamer terminal to display a video or a distance image that is currently being captured and display the distant region and the near region in different display forms in the distance image.

7. A display control method performed by a computer for streaming-distributing a video, based on a distance image in which a streamer is captured, the display control method comprising:
acquiring a depth distribution in the distance image;
determining a threshold value, based on the acquired depth distribution;
specifying, in the distance image, a distant region where depth is greater than the threshold value and a near region where depth is less than the threshold value; and
providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

8. A computer-readable recording medium recording a program causing a computer for streaming-distributing a video, based on a distance image in which a streamer is captured to execute processing of:
  acquiring a depth distribution in the distance image;
  determining a threshold value, based on the acquired depth distribution;
  specifying, in the distance image, a distant region where depth is greater than the threshold value and a near region where depth is less than the threshold value; and
  providing, in conjunction with the video, to a viewer terminal to which the video is to be streaming-distributed, control information to set the distant region as a background, set the near region as a foreground, superimpose provided information over the background, and superimpose the foreground over the background over which the provided information is superimposed.

\* \* \* \* \*